(12) United States Patent
Schreiner

(10) Patent No.: US 6,577,448 B2
(45) Date of Patent: Jun. 10, 2003

(54) LASER SYSTEM BY MODULATION OF POWER AND ENERGY

(75) Inventor: Alexander F. Schreiner, Sugar Hill, GA (US)

(73) Assignee: Siemens Dematic Electronic Assembly Systems, Inc., Norcross, GA (US)

( * ) Notice: Subject to any disclaimer, the term of this patent is extended or adjusted under 35 U.S.C. 154(b) by 0 days.

(21) Appl. No.: 10/035,692

(22) Filed: Nov. 7, 2001

(65) Prior Publication Data

US 2003/0058552 A1 Mar. 27, 2003

Related U.S. Application Data

(60) Provisional application No. 60/324,742, filed on Sep. 25, 2001.

(51) Int. Cl.$^7$ .............................................. G02B 27/30
(52) U.S. Cl. ....................................... 359/641; 359/824
(58) Field of Search ................................ 359/641, 727, 359/729, 731, 733, 740, 824

(56) References Cited

U.S. PATENT DOCUMENTS

| | | | | |
|---|---|---|---|---|
| 3,622,790 A | * | 11/1971 | Zavodny ..................... 359/154 |
| 4,096,388 A | * | 6/1978 | Wong ......................... 250/373 |
| 4,749,840 A | | 6/1988 | Piwczk .................. 219/121.68 |
| 4,749,849 A | | 6/1988 | Hoeberechts ............ 250/201.5 |
| 4,802,746 A | * | 2/1989 | Baba et al. ................. 359/667 |
| 4,874,939 A | | 10/1989 | Nishimoto .................. 257/432 |
| 4,902,115 A | * | 2/1990 | Takahashi ................... 359/362 |
| 5,018,164 A | | 5/1991 | Brewer et al. .............. 372/109 |
| 5,021,854 A | | 6/1991 | Huth ........................... 257/438 |
| 5,091,626 A | | 2/1992 | Lewis et al. ........... 219/121.69 |
| 5,146,296 A | | 9/1992 | Huth ........................... 257/429 |
| 5,246,885 A | | 9/1993 | Braren et al. ............... 438/679 |
| 5,257,706 A | | 11/1993 | McIntyre ............... 219/121.69 |
| 5,276,695 A | | 1/1994 | Scheps ......................... 372/20 |
| 5,285,467 A | | 2/1994 | Scheps ......................... 372/69 |
| 5,296,673 A | | 3/1994 | Smith ..................... 219/121.68 |
| 5,333,142 A | | 7/1994 | Scheps ......................... 372/22 |
| 5,383,199 A | | 1/1995 | Laudenslager et al. ........ 372/25 |
| 5,446,308 A | | 8/1995 | Piccone ....................... 257/438 |
| 5,500,376 A | | 3/1996 | Ishaque ........................ 438/73 |
| 5,504,763 A | | 4/1996 | Bischel ......................... 372/33 |

(List continued on next page.)

OTHER PUBLICATIONS

C. Carrier, R. Lecomte, "Recent Results in Scintillation Detection with Silicon Avalanche Photodiodes", IEEE Trans. Nucl. Sci. 37(2), 209 (1990).

G.C. Huth, "Recent results obtained with high internally amplifying semiconductor radiation detectors", IEEE Trans. Nucl. Sci. NS–13(1), 36 (1966).

F. Martin, G. Entine, R. Farrell, "Measurements of the operating characteristics of a large–area avalanche photodiode", Optical Engineering, 31(1), 48 (1992).

M.R. Squillante et al, "Avalanche Diode Low Energy X–Ray and Nuclear Particle Detector", IEEE Trans. Nucl. Sci. 33(1), 336 (1986).

(List continued on next page.)

Primary Examiner—Ricky Mack
Assistant Examiner—Brandi N. Thomas

(57) ABSTRACT

An upcollimator structure 28 for a laser system 10 is provided. The upcollimator structure 28 includes at least one concave lens 40; at least one convex lens 42 spaced from the concave lens; and at least one lens member 48 composed at least in part of piezoelectric material disposed between the lenses. When voltage is applied to the lens member 48, a refractive index of the lens member changes thus changing an upcollimation factor when a light beam is passed through the upcollimator structure. The lens member can be moved with respect to the convex lens and the concave lens thereby changing the upcollimation and focal point of the light beam as the light beam exits the optical.

24 Claims, 3 Drawing Sheets

U.S. PATENT DOCUMENTS

| | | | | |
|---|---|---|---|---|
| 5,523,543 | A | 6/1996 | Hunter, Jr. et al. | 219/121.62 |
| 5,569,399 | A | 10/1996 | Penney et al. | 219/121.69 |
| 5,656,186 | A | 8/1997 | Mourou et al. | 219/121.69 |
| 5,757,057 | A | 5/1998 | Dabrowski | 257/438 |
| 5,759,640 | A | 6/1998 | Mannava et al. | 427/554 |
| 5,943,358 | A | 8/1999 | Allik et al. | 372/95 |
| 6,108,116 | A | 8/2000 | Eskandari | 359/216 |
| 6,111,299 | A | 8/2000 | Dabrowski | 257/438 |
| 6,120,976 | A | 9/2000 | Treadwell et al. | 430/322 |
| 6,169,627 | B1 * | 1/2001 | Schuster | 359/364 |
| 6,187,213 | B1 | 2/2001 | Smith et al. | 216/28 |
| 6,226,459 | B1 * | 5/2001 | Hamada et al. | 396/54 |
| 6,304,317 | B1 * | 10/2001 | Taniguchi et al. | 355/55 |
| 6,353,203 | B1 * | 3/2002 | Hokodate et al. | 219/121.67 |
| 2002/0114568 | A1 * | 8/2002 | Judkins | 385/34 |

OTHER PUBLICATIONS

G.E. Stillman, C.M. Wolfe, Chapter 5 in "Semiconductors and Semimetals" R.K. Willardson, A.C. Beer Ed., vol. 12, 291 (1977).

R. Farrell, K. Vanderpuye, G. Entine, M.R. Squillante, "High Resolution, Low Energy Avalanche Photodiode X-Ray Detectors", IEEE Trans. Nucl. Sci. 38(2), 144 (1991).

"Reach-through" configuration.

J.A. Hauger et. al., "A time-of-flight detector based on silicon avalanche diodes", Nucl. Instrum. Meth. A337, 362 (1994).

J. Kim, Y. Yamamoto, H. Hogue, "Noise free avalanche multiplication in Si solid state photomultipliers", Appl. Phys. Lett. 70(21), pp. 2852–2854 (1997).

Methods of obtaining position sensitive information from solid state detectors.

SB Kaufman, BD Wilkins, MJ Fluss, EP Steinberg, "The response of position–sensitive detectors to fission fragments and other heavy ions", Nucl. Inst. Meth., 82, 117 (1970).

E. Gramsch, S. Zhang, M. Madden, M.Lindberg, M.Szawlowski, "High density avalanche photodiode array", Proc. SPIE vol. 2022, Oct. 1993, p. 111–119.

R.B. Owen, M.L. Awcock, "One and Two Dimensional Position Sensing Semiconductor Detectors", IEEE Trans. Nucl. Sci. NS–15, 290 (1968).

B. O. Kelly, "Lateral–Effect Photodiodes", Laser Focus, Mar. 1976, pp. 38–40.

K. Kurasawa, "An Application of PSD to Measurement of Position", Journal of the Japan Society of Precision Engineering, vol. 51, No. 4, 1985, pp. 730–737.

M. Lampton, C.W. Carlson, "Low distortion resistive anodes for two–dimensional position–sensitive MCP systems", Rev. Sci. Instrum. 50(9), Sep. 1979, pp. 1093–1097.

J.S. Lapington, J. Milnes, M. Page, M. Ingle, K. Rees, "Novel Electronic Readout Systems For Photon Counting Imagers", Proc. of SPIE, vol. 4128, 2000, pp. 120–128.

C. Martin, P. Jelinsky, M. Lampton, R.F. Malina, H.O. Anger, "Wedge–and–strip anodes for centroid finding position–sensitive photon and particle detectors", Rev. Sci. Instrum. 52(7), Jul. 1981, pp. 1067–1074.

* cited by examiner

LASER SYSTEM BY MODULATION OF POWER AND ENERGY

This application is based on U.S. Provisional Application No. 60/324,742 filed on Sep. 25, 2001 and claims the benefit thereof for priority purposes.

FIELD OF THE INVENTION

The invention relates to a laser system and, more particularly, to an upcollimator structure of a laser system that enables control of fluence and power density at an image area of the laser system.

BACKGROUND OF THE INVENTION

Conventionally, the modulation of fluence and power density (peak power density) of a laser system is achieved by varying the power output of the laser, attenuating the power, varying the repetition rate of the laser, or changing the position of the workpiece in relation to the focal plane of the respective laser system. These methods have distinct disadvantages in controlling the fluence and or power density at the workpiece. For example, changing the repetition rate of the laser will cause instability and lead to a certain predetermined set of conditions. The entire range of desired fluence and power density settings cannot be scanned. In addition, the repetition rate cannot be used to create changes in less than one second intervals for a given laser source due to the resonator instability and first pulse phenomena. Thus, changing the repetition rate of the laser tends to introduce a large amount of variability in the fluence and power density.

In addition, using the pumping power to change the laser power output has similar disadvantages as described above with regard to the changing the repetition rate.

The power attenuation is an excellent machine design to adjust the fluence and the power density in terms of the stability, but it relies on a measurement and feedback loop to determine the power at or somewhere in the optical train of the laser system. There is also a loss in the throughput of the system, since some of the beam is used for feedback purposes. Another important item is that the attenuation will need to be set to 5–10% lower than the maximum fluence and/or power density to have an effective control system.

None of the aforementioned machine features can effectively control the depth of focus.

Accordingly, there is a need to provide an upcollimator structure for a laser system that can easily control fluence and power density at an image area of the system.

SUMMARY OF THE INVENTION

An object of the invention is to fulfill the need referred to above. In accordance with the principles of the present invention, this objective is achieved by providing an upcollimator structure for a laser system. The upcollimator structure includes at least one concave lens; at least one convex lens spaced from the concave lens; and at least one lens member composed at least in part of piezoelectric material disposed between the lenses or a lens member mounted on a positioner. When voltage is applied to the lens member, a refractive index of the lens member changes thus changing an upcollimation factor when a light beam is passed through the upcollimator structure.

In accordance with another aspect of the invention, an upcollimator structure for a laser system includes a first lens structure including at least one concave lens, and a second lens structure including at least one convex lens. At least one of the lenses is composed at least in part of piezoelectric material, whereby, when voltage is applied thereto, a refractive index thereof changes thus changing an upcollimation factor when a light beam is passed through the upcollimator structure.

In accordance with yet another aspect of the invention, a method of controlling fluence and power density of a laser system which generates a light beam is provided. The laser system has an upcollimator structure including as an optical system, at least one convex lens, at least one concave lens spaced from the convex lens, and at least one lens member, composed at least in part of piezoelectric material, disposed between the convex lens and the concave lens. The method includes directing the light beam through the optical system at a first fluence setting and a first power density setting, and supplying voltage to the lens member to change a refractive index of the lens member and directing the light beam through the optical system thereby providing a second fluence setting and a second power density setting.

The lens member can be moved with respect to the convex lens and the concave lens thereby changing the upcollimation and focal point of the light beam as the light beam exits the optical system to provide a third fluence setting and a third power density setting.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE PREFERRED EMBODIMENT

Figure 1:
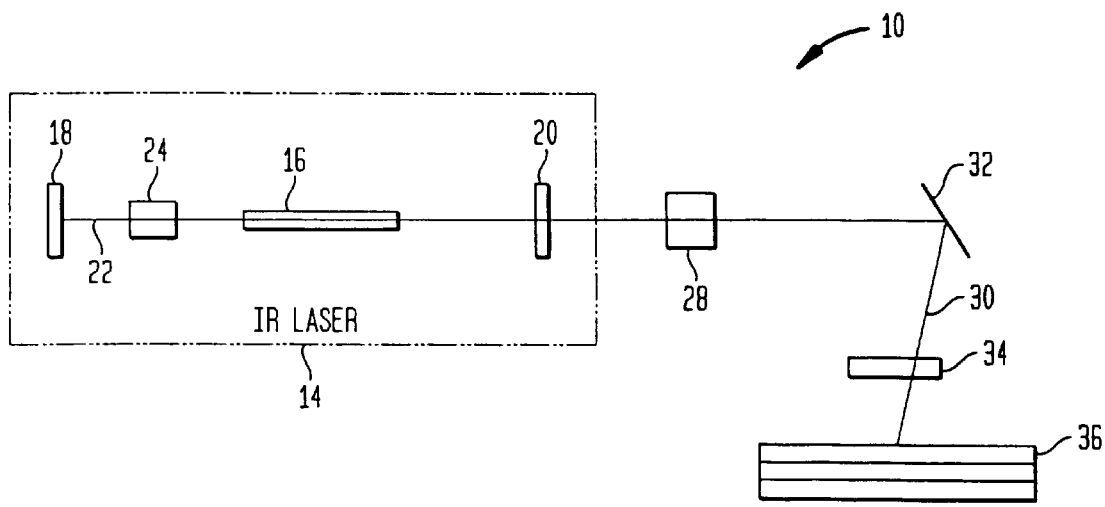
FIG. 1 is a schematic illustration of an embodiment of a laser system provided in accordance with the principles of the present invention.

With reference to FIG. 1, a preferred embodiment of a laser system 10 is shown in accordance with the present invention. The laser system 10 includes a IR laser 12 having a resonator cavity 14 which comprises a lasant 16 positioned between a highly reflective mirror 18 and a partially transmissive mirror (or output coupler) 20 along a beam path 22. The lasant 16 in the resonator cavity 14 is preferably a solid-state laser rod comprising Nd:YAG, Nd:YAP, Nd:YVO$_4$. However, those skilled in the art will recognize that other solid-state lasants or even gas, semiconductor or tunable organic dye lasants could be used in the lasers 12.

For example, suitable gas lasants and their fundamental wavelengths could include Nitrogen (337.1 nm), HeCd (325.0–441.6 nm), Argon (457.9–514.5 nm), Krypton (350.7–799.3 nm), HeNe (632 nm), CO ($4.0 \times 10^3$–$5.5 \times 10^3$ nm), $CO_2$ ($10.6 \times 10^3$ nm), and $H_2O$ ($118.3 \times 10^3$ nm). As another example, suitable solid-state lasants could include Ruby (694.3 nm), Nd:Glass ($1.06 \times 10^3$ nm), Nd:YAG ($1.06 \times 10^3$ nm), Nd:YAP ($1.06 \times 10^3$ nm), and Nd:$YVO_4$, while suitable semiconductor lasants could include GaAs (904 nm for a single diode or 850±50 nm for an array of 48 diodes).

Laser rod 16 may be pumped by a variety of pumping sources (not shown) well known to persons skilled in the art, such as thermal, electrical or optical. However, a suitable diode pump or are lamp is preferred for the illustrated Neodymium based laser system.

The resonator cavity 14 is illustrated with an associated Q-switch 24 which preferably operates by electro-optical or accusto-optical means. Other well known laser components (e.g., polarizers, limiting apertures, attenuators and the like) and their uses, positioning, and operation are well known to those skilled in the art and could be utilized inside the resonator cavities as desired.

The IR output from the resonator 14 is passed through an upcollimator structure 28, after which it is deflected downwardly along a beam path 30 by a beam-directing reflector 32 into a focusing lens 34 and then to a multi-layered target 36.

Instead of employing an IR laser, the laser 10 can be a green laser to produce green light (e.g., between about 500 nm to about 580 nm), a UV laser (e.g., UV light at harmonics of 1064 nm fundamental wavelength) or a multiple wavelength laser (e.g., EM radiation at a fundamental wavelength of 1064 nm).

Figure 2:
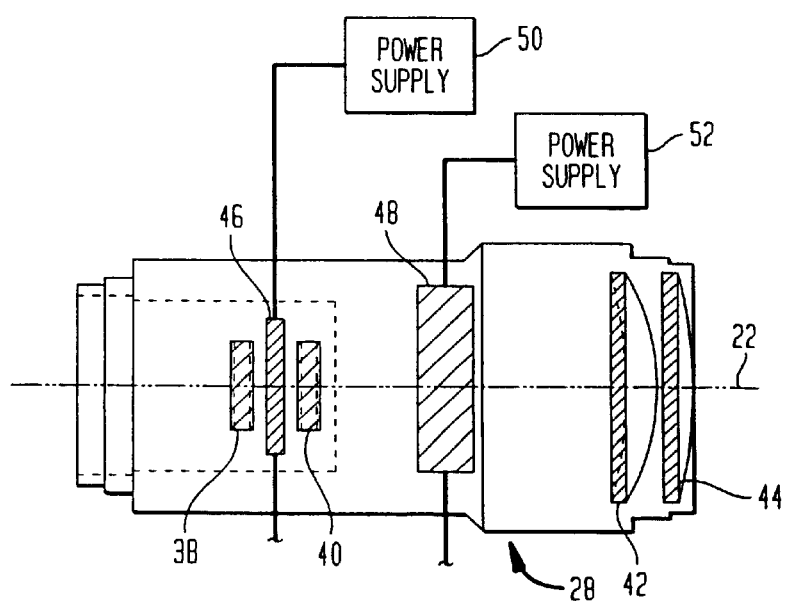
FIG. 2 is a schematic illustration of a first embodiment of an upcollimator structure of the laser system of FIG. 1.

With reference to FIG. 2, a first embodiment of the upcollimator structure 28 is shown having first lens structure including a pair of first concave lenses 38 and 40 and second lens structure including a pair of convex lenses 42 and 44 spaced from the concave lenses 38 and 40. In accordance with the invention, a lens member 46, at least part of which is made from piezoelectric material such as quartz, is disposed between the concave lenses 38 and 40 and is part of the optical system. In addition, a second lens member 48, at least part of which is of piezoelectric material such as quartz, is disposed between the lens 40 and lens 42. In the embodiment, preferably the entire lens members 46 and 48 are composed of piezoelectric material. A power supply 50 provides voltage to the lens member 46 and another power supply 52 provides a voltage to lens member 48. Thus, the refractive index of the lens members 46 and 48 can be changed by applying voltage thereto which results in different upcollimation/focal points being achieved in the laser system 10.

Figure 3:
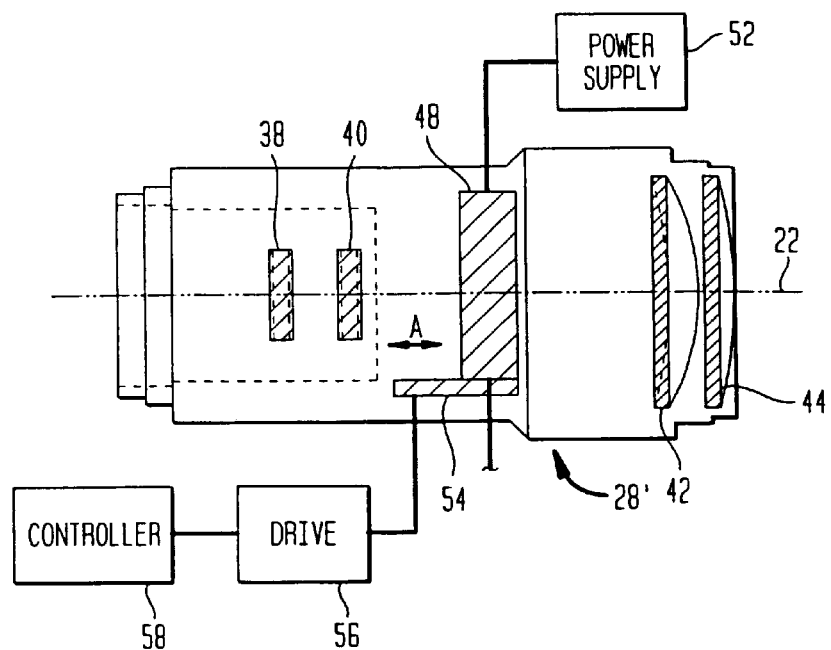
FIG. 3 is a schematic illustration of a second embodiment of an upcollimator structure of the laser system of FIG. 1.

With reference to FIG. 3, a second embodiment of the upcollimator structure 28' is shown having a pair of first concave lenses 38 and 40 and a pair of convex lenses 42 and 44 spaced from the concave lenses 38 and 40. In accordance with the invention, a lens member 48, at least a part of which is made from piezoelectric material such as quartz, is disposed between lens 40 and lens 42 and is part of the optical system. A power supply 52 provides voltage to the lens member 48. Thus, as above, the refractive index of the lens member 48 can be changed by applying voltage thereto which results in different upcollimation factors being achieved in the laser system 10. In addition, the lens member is mounted on a movable structure 54 so that the lens member 48 can be moved in the direction of arrow A (along an optical axis) between the lenses 40 and 42. A high accuracy drive 56 is provided to move the movable structure 54. In the broadest aspects of the invention, the movable structure 54 can be considered to be part of the drive 56. For example, a stepper motor system or any suitable device can be employed to move the lens member 48. A controller 58 is provided to control operation of the drive 56. Thus, adjusting the positional relation of the lens member 48 between lenses 40 and 42 allows for the adjustment of the upcollimation and focal point of the lens system 10.

Figure 4:
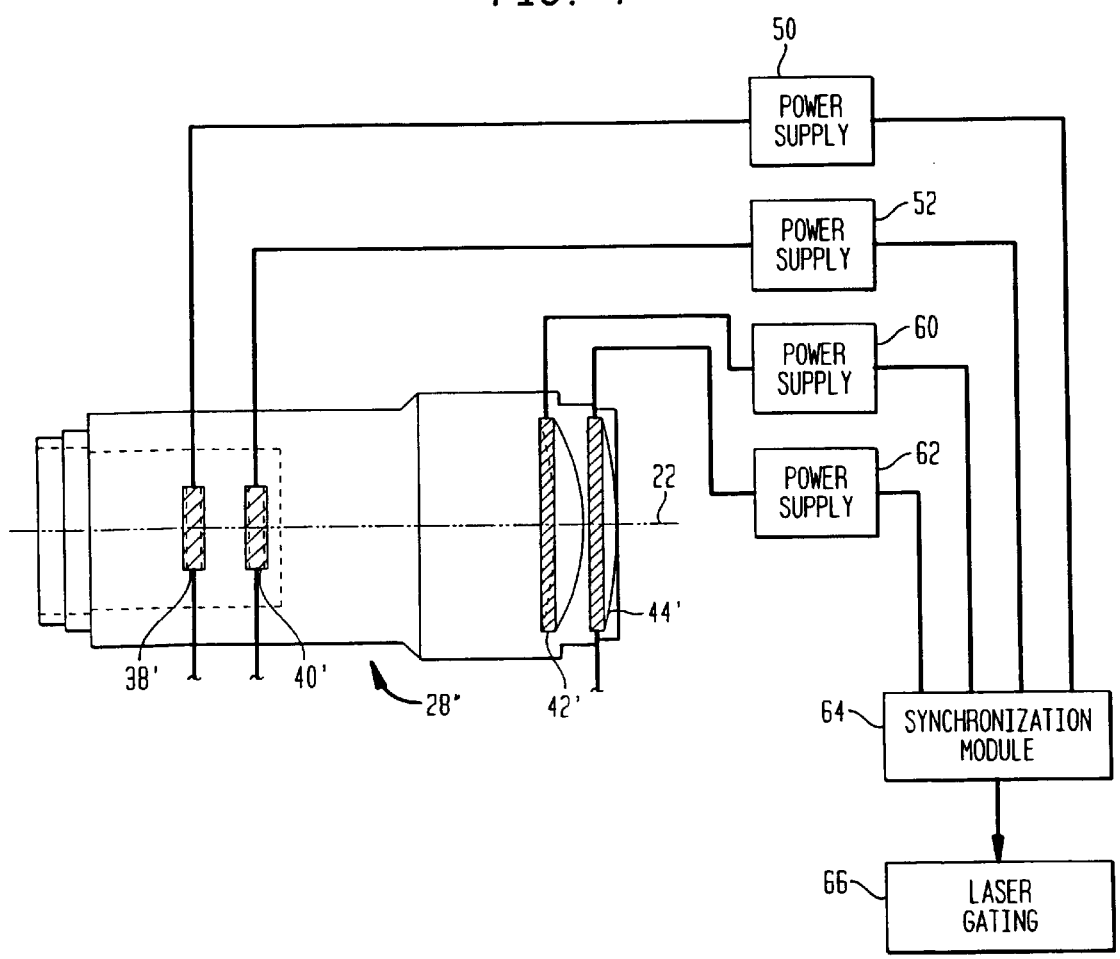
FIG. 4 is a schematic illustration of a third embodiment of an upcollimator structure of the laser system of FIG. 1.

With reference to FIG. 4, a third embodiment of the upcollimator structure 28" is shown having a pair of first concave lenses 38' and 40' and a pair of convex lenses 42' and 44' spaced from the concave lenses 38' and 40'. In accordance with the invention, at least one of the lenses 38', 40', 42' or 44' is composed completely, or at least partially, from piezoelectric material such as quartz. In the illustrated embodiment, all lenses 38', 40', 42' and 44' are composed of piezoelectric material and are supplied with voltage via respective power supplies 50, 52, 60, and 62 to create various refractive indices for the lens system 10. Thus, the modulation of the lenses 38', 40', 42' and 44' enables different upcollimation and different focal points to be achieved. The lens properties of one or more lenses 38', 40', 42' and 44' or optical elements (filters/lightpipe/waveguide/window etc,) are directly affected by constructing them from piezoelectric material and then using a high voltage with variable frequency to control the optical properties of the lenses. This allows for a tighter control of the fluence and energy density in relation to very short machining processes (typically <1 sec).

In the illustrated embodiment, the power supplies 50, 52, 60 and 62 are each connected to a synchronization module 64 which in turn is connected to a laser gating signal 66. The synchronization module 64 is configured to adjust the power density or energy density at distinct intervals from gating commands. The laser system 10 is preferably used to create vias for circuit boards. Thus, the intervals are determined by the desired properties of the via, e.g., blind or through hole, diameter of hole, material of via, etc.

Although the upcollimator structure 28 of the invention is shown in the embodiments to include a first lens structure having a pair of first concave lenses 38 and 40 and second lens structure having a pair of convex lenses 42 and 44, it can be appreciated that the upcollimator structure 28 could include only one convex lens and only one concave lens.

Figure 5:
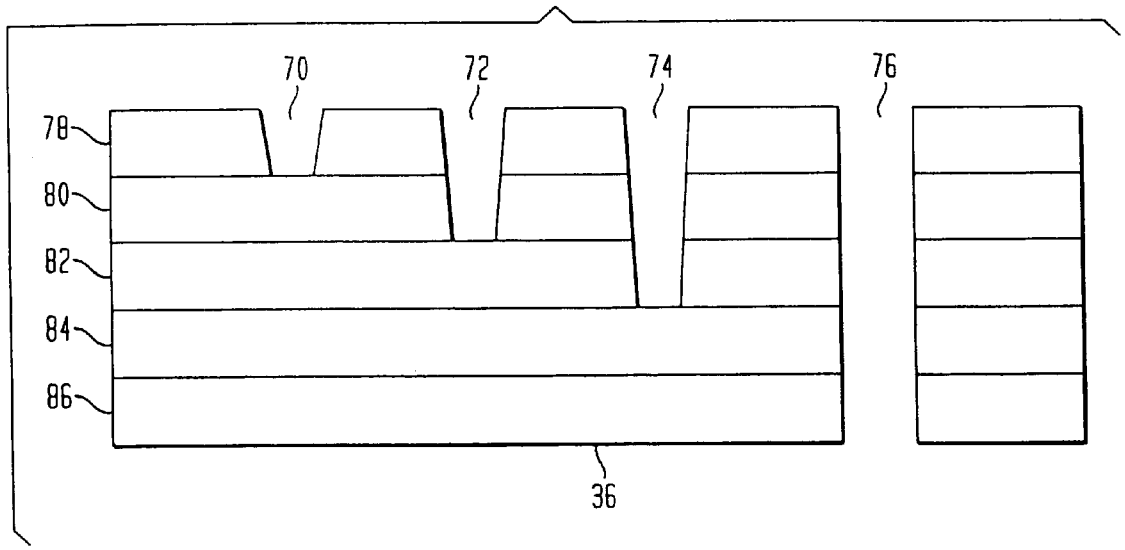
FIG. 5 is sectional side view of a multi-layered target having vias therein as formed by the laser system of the present invention.

With reference to FIG. 5, a preferred method of using the laser system 10 to form vias 70, 72, 74 and 76 in a multiplayer target 36 (e.g., a circuit board) will be described. Multi-layered target 36 is illustrated with a top conductor layer 78, an upper dielectric layer 80, an embedded conductor layer 82, a lower dielectric layer 84, and a bottom conductor layer 86. Conductor layers 78, 82 and 86 may comprise conductive metals such as copper, aluminum, titanium, nickel, tungsten, platinum, gold, molybdenum, palladium, silver, or combinations thereof. Dielectric layers 80 and 84 may comprise an organic composition such as PTFE, polyimides, epoxies, or combinations thereof. The dielectric materials may be reinforced with glass fibers, aramid fibers, KEVLAR, ceramics, or combinations thereof. In the preferred embodiment, conductor layers 78, 82 and 86 are copper and dielectric layers 80 and 84 are either RCC or FR4, both of which contain epoxy, an organic dielectric material. FR4 also contains glass reinforcement. It should be apparent that these construction used in the PCB manufacturing are only examples of dielectric conductor layers used to form circuits. The example is only one of a multitude of constructions.

The stepwise formation of vias through discrete fluence and power densities is shown in FIG. 5. For example, via 70 is created with a first fluence setting and a first power density setting. Via 72 is created with a second fluence setting and a second power density setting. Via 74 is created with a third fluence setting and a third power density setting. Via 76 is created with an "n" fluence setting and an "n" power density setting with "n" being number of layers of the target 36. The changes in fluence and power density can be achieved by supplying voltage to the piezoelectric lenses or lens members and mechanically moving the piezoelectric lens member with respect to the lenses in various combinations.

The upcollimator structure 28 of the invention is applicable to all laser systems that are used in a wide variety of industries today. The function of the invention is twofold: one, to obtain a variable fluence and power density at the image area of a laser system, and two, to be able to adjust the Depth of Field orthogonally to the plane of the image area. This is coupled to a fast and electronically synchronized control of the aforementioned properties. The machining of materials in three dimensional space can be achieved by this method.

Materials that are too thick for the conventional laser systems with a fixed optical system can be machined with the laser system 10 of the invention. Furthermore, parts constructed from different layers of materials can be machined using multiple step processes. These multiple steps can be executed at higher rates and with a better precision than conventional methods. Still further, the laser system 10 enables a higher degree of quality in terms of the thermal loading and the definition of the imaged/machined feature.

The advantage for the piezo-electric modulation through the lenses or optics and the mechanical modulation via the drive 56 is that the fluence, power density and DOF can be modulated quickly. It will take less than 1 millisecond to change the respective properties. This will enable machining the multiple steps in one via rather than sequentially as it is conventionally performed. The advantage for the mechanical modulation of the lens (FIG. 3) is robustness. The fluence, power density and DOF can be modulated on a time scale of 10–1 milliseconds. This is still faster than the existing change of the distance to the workpiece in relation to the focal plane or focal plane in relation to the workpiece. The system and method of the invention are also more stable than changing the frequency/pumping power. This will enable machining the multiple steps in one via rather than sequentially as it is conventionally performed.

The method discuss ed herein is based on discreetly and continuously changing the beam energy density and power density in conjunction with the aforementioned parameters. This allows the machining of three dimensional structures in the electronic materials. The resulting structures (vias) are better in quality and allow for improved manufacturing of the devices. The improvement is based on the adjustment of the energy density during the formation of structures i.e., vias, to accomplish:

1. Lower thermal loading
2. Higher throughput rates (adjustment of Fluence/Density during machining process)
3. Less lateral and depth damage in the materials
4. Faster movement between ablation thresholds for metal and non-met metal electronic materials
5. Drilling of through holes in entire circuit board, previously not possible with the adjustment of the only frequency, distance, and power of the laser
6. Significant reduction in "barreling" in multi-layer laminates In addition, the method of the invention can maintain the fluence and power density levels constant and therefore maintains the optimum processing conditions for each material throughout the thickness of the layer of the target. Adjusting the depth of focus maintains the same fluence and power density values throughout a machining process. The machining process can be stepwise penetration of layers or continuous penetration of layers or multiple layers to the target. The depth of focus is continually or incrementally changed during machining of different layers of the target to avoid beam clipping by upper layers of the target.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An upcollimator structure for a laser system, the upcollimator structure comprising:
    at least one concave lens, at least one convex lens spaced from the concave lens, and
    at least one lens member composed at least in part of piezoelectric material disposed between the lenses, whereby, when voltage is applied to the lens member, a refractive index of the lens member changes thus changing an upcollimation factor when a light beam is passed through the upcollimator structure.

2. The upcollimator structure of claim 1, wherein the at least one lens member is composed of quartz.

3. The upcollimator structure of claim 1, wherein a pair of concave lenses are in spaced relation and a pair of convex lenses are provided, the pair of concave lenses being spaced from the pair of convex lenses.

4. The upcollimator structure of claim 3, wherein a first said lens member is provided between the pair of concave lenses and a second said lens member is provided between convex lens and a concave lens.

5. The upcollimator structure of claim 4, wherein a first power supply supplies voltage to the first lens member and a second power supply supplies power to the second lens member.

6. The upcollimator structure of claim 1, further including a drive associated with at least one lens member to move at least one lens member along an optical axis with respect to the concave lens and convex lens.

7. The upcollimator of claim 6, wherein the lens member is mounted on a movable structure driven by the drive.

8. An upcollimator structure for a laser system, the upcollimator structure comprising:
    a first lens structure including at least one concave lens, and
    a second lens structure including at least one convex lens,
    at least one of said lenses being composed at least in part of piezoelectric material, whereby, when voltage is applied to said at least one of said lenses, a refractive index thereof changes thus changing an upcollimation factor when a light beam is passed through the upcollimator structure.

9. The upcollimator structure of claim 8, wherein the first lens structure includes a pair of concave lenses and the second lens structure includes a pair of convex lenses, the pair of concave lenses being spaced from the pair of convex lenses.

10. The upcollimator structure of claim 9, wherein each lens of the pair of concave lenses and each lens of the pair of convex lenses are composed at least in part from piezoelectric material.

11. The upcollimator structure of claim 10, further including a power supply associated with each lens to supply voltage to the associated lens.

12. The upcollimator structure of claim 11, wherein each power supply is connected to a synchronization module that is connected to a laser gating signal, the synchronization module being configured to adjust power or energy density at distinct intervals from gating commands.

13. The upcollimator structure of claim 12, wherein each lens is composed of quartz.

14. A method of controlling fluence and power density of a laser system which generates a light beam, the laser system having an upcollimator structure including as an optical system, at least one convex lens, at least one concave lens spaced from the convex lens, and at least one lens member, composed at least in part of piezoelectric material, disposed between the convex lens and the concave lens, the method including:

directing the light beam through the optical system at a first fluence setting and a first power density setting, and supplying voltage to the lens member to change a refractive index of the lens member and directing the light beam through the optical system thereby providing a second fluence setting and a second power density setting.

15. The method of claim 14, further including:

moving the lens member with respect to the convex lens and the concave lens thereby changing the upcollimation and focal point of the light beam as the light beam exits the optical system to provide a third fluence setting and a third power density setting.

16. The method of claim 14, wherein a multi-layered target is ablated in multiple steps via the light beam at the first fluence setting and a first power density setting, and thereafter at the second fluence setting and a second power density setting.

17. The method of claim 16, including continuously adjusting fluence and power density to maintain the same values of fluence and power density while penetrating single layers or all layers of the multi-layered target.

18. The method of claim 17, including adjusting depth of focus to maintain the same fluence and power density values throughout a machining process.

19. The method of claim 18, wherein the depth of focus is continually or incrementally changed during machining of different layers of the target to avoid beam clipping by upper layers of the target.

20. A method of controlling fluence and power density of a laser system which generates a light beam, the laser system having an upcollimator structure including as an optical system, at least one convex lens and at least one concave lens spaced from the convex lens, at least one of the convex and concave lenses being composed at least in part of piezoelectric material, the method including:

directing the light beam through the optical system at a first fluence setting and a first power density setting, and supplying voltage to the at least one lens having piezoelectric material to change a refractive index thereof and directing the light beam through the optical system thereby providing a second fluence setting and a second power density setting.

21. The method of claim 20, wherein both the convex lens and the concave lens are composed at least in part of piezoelectric material and the method includes supplying voltage to both the convex lens and concave lens.

22. The method of claim 20, including continuously adjusting fluence and power density to maintain the same values of fluence and power density while penetrating single layers or all layers of a multi-layered target.

23. The method of claim 22, including adjusting depth of focus to maintain the same fluence and power density values throughout a machining process.

24. The method of claim 23, wherein the depth of focus is continually or incrementally changed during machining of different layers of the target to avoid beam clipping by upper layers of the target.

* * * * *